US011042357B2

(12) United States Patent
Wu et al.

(10) Patent No.: US 11,042,357 B2
(45) Date of Patent: Jun. 22, 2021

(54) SERVER AND METHOD FOR RANKING DATA SOURCES

(71) Applicant: Microsoft Technology Licensing, LLC, Redmond, WA (US)

(72) Inventors: Zhiyuan Wu, Waterloo (CA); Mahmoud Adada, Kitchener (CA); Petar Cota, Kitchener (CA); Matthew Dixon, Waterloo (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 15/319,744

(22) PCT Filed: Jun. 16, 2015

(86) PCT No.: PCT/CA2015/000387
§ 371 (c)(1),
(2) Date: Apr. 20, 2017

(87) PCT Pub. No.: WO2015/192209
PCT Pub. Date: Dec. 23, 2015

(65) Prior Publication Data
US 2017/0153870 A1  Jun. 1, 2017

Related U.S. Application Data

(60) Provisional application No. 62/013,240, filed on Jun. 17, 2014.

(51) Int. Cl.
*G06F 16/00* (2019.01)
*G06F 7/24* (2006.01)
(Continued)

(52) U.S. Cl.
CPC ............ *G06F 7/24* (2013.01); *G06F 16/9535* (2019.01); *H04L 41/5009* (2013.01); *H04L 41/5022* (2013.01); *H04L 43/50* (2013.01)

(58) Field of Classification Search
CPC ................. G06F 7/24; G06F 17/30867; G06F 17/30864; G06F 11/3476; G06F 11/3409;
(Continued)

(56) References Cited

U.S. PATENT DOCUMENTS

2006/0245367 A1* 11/2006 Jeffery .................... H04L 29/06 370/248
2007/0067225 A1   3/2007 Fabris et al.
(Continued)

OTHER PUBLICATIONS

PCT International Search Report and Written Opinion in PCT/CA2015/000387, dated Sep. 3, 2015, 8 pages.
(Continued)

*Primary Examiner* — Ashish Thomas
*Assistant Examiner* — Suman Rajaputra

(57) ABSTRACT

A server, method, and non-transitory computer readable medium for ranking a plurality of data sources are provided. The server includes a network interface, a memory storage unit and a processor. The method involves sending a test message, monitoring an external network for a response to the test message, determining whether a service level is satisfied and adjusting the rank of the data source. The non-transitory computer readable medium is encoded with programming instructions to direct a processor to carry out the method.

29 Claims, 4 Drawing Sheets

(51) Int. Cl.
*G06F 16/9535* (2019.01)
*H04L 12/24* (2006.01)
*H04L 12/26* (2006.01)

(58) Field of Classification Search
CPC ............. G06F 11/3466; H04L 41/5009; H04L 41/5022; H04L 43/50; G06Q 30/02
See application file for complete search history.

(56) References Cited

U.S. PATENT DOCUMENTS

| | | |
|---|---|---|
| 2007/0282813 A1* | 12/2007 | Cao .................... G06Q 30/0275 |
| 2008/0046550 A1 | 2/2008 | Mazur et al. |
| 2008/0082662 A1* | 4/2008 | Dandliker ............... H04L 63/10 709/225 |
| 2013/0297362 A1 | 11/2013 | Yagi |
| 2014/0057632 A1 | 2/2014 | Hole et al. |
| 2014/0269269 A1* | 9/2014 | Kovvali ................ H04W 24/04 370/229 |
| 2014/0280230 A1* | 9/2014 | Masato ................. G06F 16/487 707/749 |

OTHER PUBLICATIONS

PCT International Preliminary Report on Patentabiltiy in PCT/CA2015/000387, dated Dec. 20, 2016, 6 pages.

* cited by examiner

US 11,042,357 B2

SERVER AND METHOD FOR RANKING DATA SOURCES

CROSS-REFERENCE TO RELATED APPLICATION

This application is a U.S. National Stage Application of PCT/CA2015/000387, filed Jun. 16, 2015, which claims benefit of U.S. Provisional Patent Application No. 62/013,240, filed Jun. 17, 2014, which applications are hereby incorporated by reference in their entireties. To the extent appropriate, a claim of priority is made to each of the above disclosed applications.

FIELD

The present specification relates to methods and systems for ranking data sources, and more particularly to methods and systems for ranking external data sources.

BACKGROUND

Various methods and systems for providing content from third party services to a user have been developed. For example, typical search engines obtain a list of results for presentation to a user. To obtain these lists, typical search engines crawl the web an apply algorithms to determine the ranking of third party websites based on a search query.

SUMMARY

In accordance with an aspect of the specification, there is provided a server for ranking of a plurality of data sources. The server includes a network interface for connecting to an external network having a plurality of data sources. Furthermore, the server includes a memory storage unit for storing a ranking table of the plurality of data sources. In addition, the server includes a processor in communication with the network interface and the memory storage unit. The processor is configured to send a test message to a preferred data source periodically via the network interface, wherein the preferred data source is from the plurality of data sources. The processor is further configured to monitor for a response message from the preferred data source. The processor is further configured to determine whether the response message was received in accordance with a service level. The processor is also configured to adjust a rank of the preferred data source in the ranking table based on the response message when the service level is not satisfied.

The processor may be configured to generate the ranking table.

The network interface may be configured to receive an input query. The input query may be configured to retrieve information from at least one of the plurality of the data sources.

The ranking table may be generated based on the input query and characteristics of each data source of the plurality of data sources.

The ranking table may be generated based on a location associated with the input query and the characteristics of each data source of the plurality of data sources.

The ranking table may be generated based on a language of the input query and the characteristics of each data source of the plurality of data sources.

The processor may be configured to measure a speed of the response message.

The processor may be configured to determine whether the speed of the response message is slower than a second speed associated with a second data source.

The processor may be configured to determine whether the response message was received before a predetermined time interval.

The processor may be configured to block the preferred data source when the service level is not satisfied.

The processor may be configured to determine intermittently whether the preferred data source subsequently satisfies the service level after the preferred data source fails to satisfy the service level.

The processor may be configured to send intermittent recovery messages to the preferred data source after the preferred data source fails to satisfy the service level.

The processor may be configured to send the recovery messages separated by a varying time delay.

The processor may be configured to increase the varying time delay between each of the recovery messages.

In accordance with an aspect of the specification, there is provided a method of ranking of a plurality of data sources. The method involves sending a test message from a server to a preferred data source periodically via an external network. The preferred data source is from the plurality of data sources. Furthermore, the method involves monitoring the external network for a response message from the preferred data source in response to the test message. In addition, the method involves determining, at the server, whether the response message was received in accordance with a service level. Also, the method involves adjusting a rank of the preferred data source in a ranking table based on the response message when the service level is not satisfied The method may further involve generating the ranking table.

The method may further involve receiving an input query. The input query may be configured to retrieve information from at least one of the plurality of the data sources.

The ranking table may be generated based on the input query and characteristics of each data source of the plurality of data sources.

The ranking table may be generated based on a location associated with the input query and the characteristics of each data source of the plurality of data sources.

The ranking table may be generated based on a language of the input query and the characteristics of each data source of the plurality of data sources.

Determining whether the response message was in accordance with the service level may involve measuring a speed of the response message.

Determining whether the response message was in accordance with the service level may involve determining whether the speed of the response message is slower than a second speed associated with a second data source.

Determining whether the response message was in accordance with the service level may involve determining whether the response message was received before a predetermined time interval.

The method may further involve blocking the preferred data source when the service level is not satisfied.

The method may further involve intermittently determining whether the preferred data source subsequently satisfies the service level after the preferred data source fails to satisfy the service level.

Intermittently determining may involve intermittently sending recovery messages to the preferred data source.

Intermittently determining may involve sending the recovery messages separated by a varying time delay.

The method may further involve increasing the varying time delay between each of the recovery messages.

In accordance with an aspect of the specification, there is provided a non-transitory computer readable medium encoded with codes for ranking of a plurality of data sources. The codes are for directing a processor to send a test message from a server to a preferred data source periodically via an external network. The preferred data source is from the plurality of data sources. Furthermore, the codes are for directing the processor to monitor the external network for a response message from the preferred data source in response to the test message. In addition, the codes are for directing the processor to determine whether the response message was received in accordance with a service level. Also, the codes are for directing the processor to adjust a rank of the preferred data source in a ranking table based on the response message when the service level is not satisfied.

BRIEF DESCRIPTION OF THE DRAWINGS

Reference will now be made, by way of example only, to the accompanying drawings in which.

DETAILED DESCRIPTION OF THE EMBODIMENTS

Figure 1:
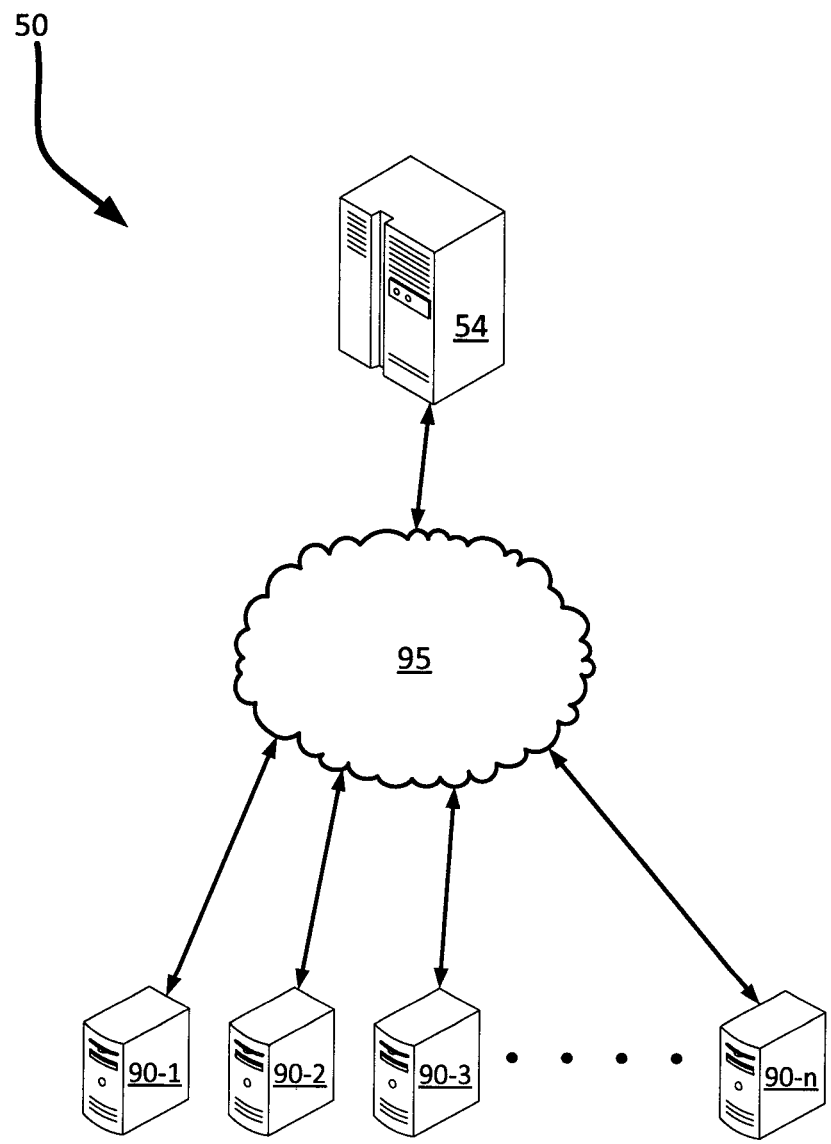
FIG. 1 is a schematic representation of a system ranking a plurality of data sources in accordance with an embodiment.

Referring to FIG. 1, a schematic representation of a computer network system is shown generally at 50. It is to be understood that the system 50 is purely exemplary and it will be apparent to those skilled in the art that a variety of computer network systems are contemplated. The system 50 includes a server 54 and a plurality of data sources 90-1, 90-2, 90-3, . . . , 90-n for providing information. Generically, these data sources are referred to as "data source 90" and collectively they are referred to as "data sources 90". The server 54 and the data sources 90 are connected by a network 95. The network 95 is not particularly limited and can include any type of network such as the Internet, an intranet or a local area network, or a mobile network. In some embodiments, the network 95 can also include a peer to peer network.

In the present embodiment, the data sources 90 are generally configured to provide information upon receiving a query. The manner by which the data sources 90 operate is not particularly limited. For example, in the present embodiment, each of the data sources 90 can be associated with a separate service providers. For example, the data source 90-1 can be associated with a database of general businesses maintained by a service provider, the data source 90-2 can be associated with a second database of businesses specializing in a specific type of business, such as restaurants, maintained by another service provider, and the data source 90-3 can be associated with a third database of general businesses, maintained by yet another service provider who is a competitor of the service provider associated with the data source 90-1. Accordingly, it is to be appreciated that each of the data sources 90 may offer similar information upon receiving similar search queries based on the same input query. However, it is also to be appreciated that the data sources 90 may include slightly different information since the service providers generally operate independently from each other and may use different ranking algorithms when presenting results.

In the present embodiment, the server 54 can be any type of computing device generally used to receive input, process the input and provide output. The server 54 is not particularly limited and can include a variety of different devices depending on the specific application of the server 54. For example, the server 54 can be optimized for its specific role in the system 50, such as for communicating with the data sources 90. Suitable devices the server 54 can include high performance blade server systems running UNIX operating systems, and having multiple processors. Alternatively, the server 54 can include devices such as a personal computer, a personal digital assistant, a tablet computing device, cellular phone, or laptop computer configured to carry out similar functions for systems not requiring a server with significant processing power. In other embodiments, the server 54 can also be implemented as a virtual server, a rented server session in the cloud, or any combination of the above.

It is to be re-emphasized that the system 50 described above is a non-limiting representation only. For example, although the present embodiment shown in FIG. 1 illustrates a single server 54 connected to the data sources 90, other embodiments can include a network of servers for where each server can be configured to communicate with a single data source to improve efficiencies. Furthermore, it is it is to be understood, with the benefit of this description, that although each data source 90 is shown to be provided on separate machines, some embodiments can combine multiple data sources 90 into a single machine.

Figure 2:
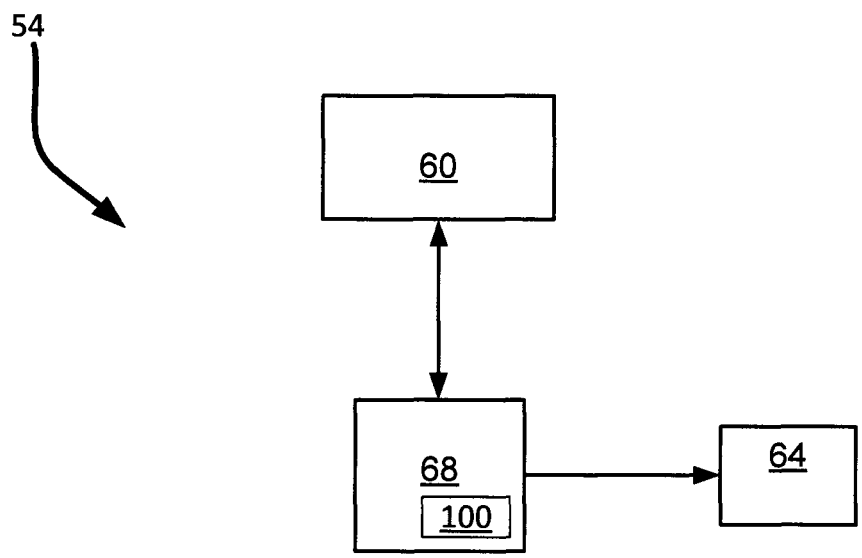
FIG. 2 is a schematic representation of a server in accordance with the embodiment shown in FIG. 1.

Referring to FIG. 2, a schematic block diagram showing various components of the server 54 is provided. It should be emphasized that the structure in FIG. 2 is purely exemplary and several different implementations and configurations for the server 54 are contemplated. The server 54 generally includes a network interface 60, and a memory storage unit 64, and a processor 68.

The network interface 60 is not particularly limited and can include various network interface devices such as a network interface controller (NIC) capable of communicating with data sources 90 across the network 95. In the present embodiment, the network interface 60 is generally configured to connect to the network 95 via a standard Ethernet connection.

The memory storage unit 64 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 64 is generally configured to store a ranking table of the data sources 90. In addition, the memory storage unit 64 can be configured to store codes for directing the processor 68 for carrying out computer implemented methods. For example, the codes can include the programming instructions 100 further described below. Furthermore, the memory storage unit 64 can be configured to store data associated with the characteristics of each of the data sources 90. It is to be appreciated, with the benefit of the description, that the memory storage unit 64 can be used to store data on a permanent basis for caching purposes or on a temporary basis depending on the specific application and hardware available for the application.

The processor 68 is not particularly limited and is generally configured to execute programming instructions 100 for generating and sending a test message to a preferred data source from the plurality of data sources 90 using the network interface 60. The manner by which the preferred data source is selected is not particularly limited and will be discussed in greater detail below. For example and to provide greater clarity to the understanding of the present embodiment, it can be assumed that the data source 90-1 is selected as the preferred data source. In this example, the programming instructions 100 direct the processor 68 to monitor for a response message from the data source 90-1. The manner by which the processor 68 carries out the monitoring is not particularly limited. For example, the expected response message can include an identifier for identifying the type of message as well as the source of the message, such that the processor 68 can analyze each message received at the network interface 60 for this identifier. In the present embodiment, the processor 68 can be further directed to determine whether the response message was received in accordance with a predetermined service level which is discussed further below. When the response message is not received in a manner that satisfies the predetermined service level, the programming instructions 100 direct the processor 68 to adjust the rank of the data source 90-1 stored in the ranking table in the memory storage unit 64. It is to be appreciated that by lowering the rank of the data source 90-1, the data source 90-1 would no longer be the preferred data source.

It is to be re-emphasized that the server 54 described above is a non-limiting representation only. For example, in other embodiments, the memory storage unit 64 can be modified or omitted when the server 54 accesses memory or a ranking table from a different source, such as another server or over the cloud.

Figure 3:
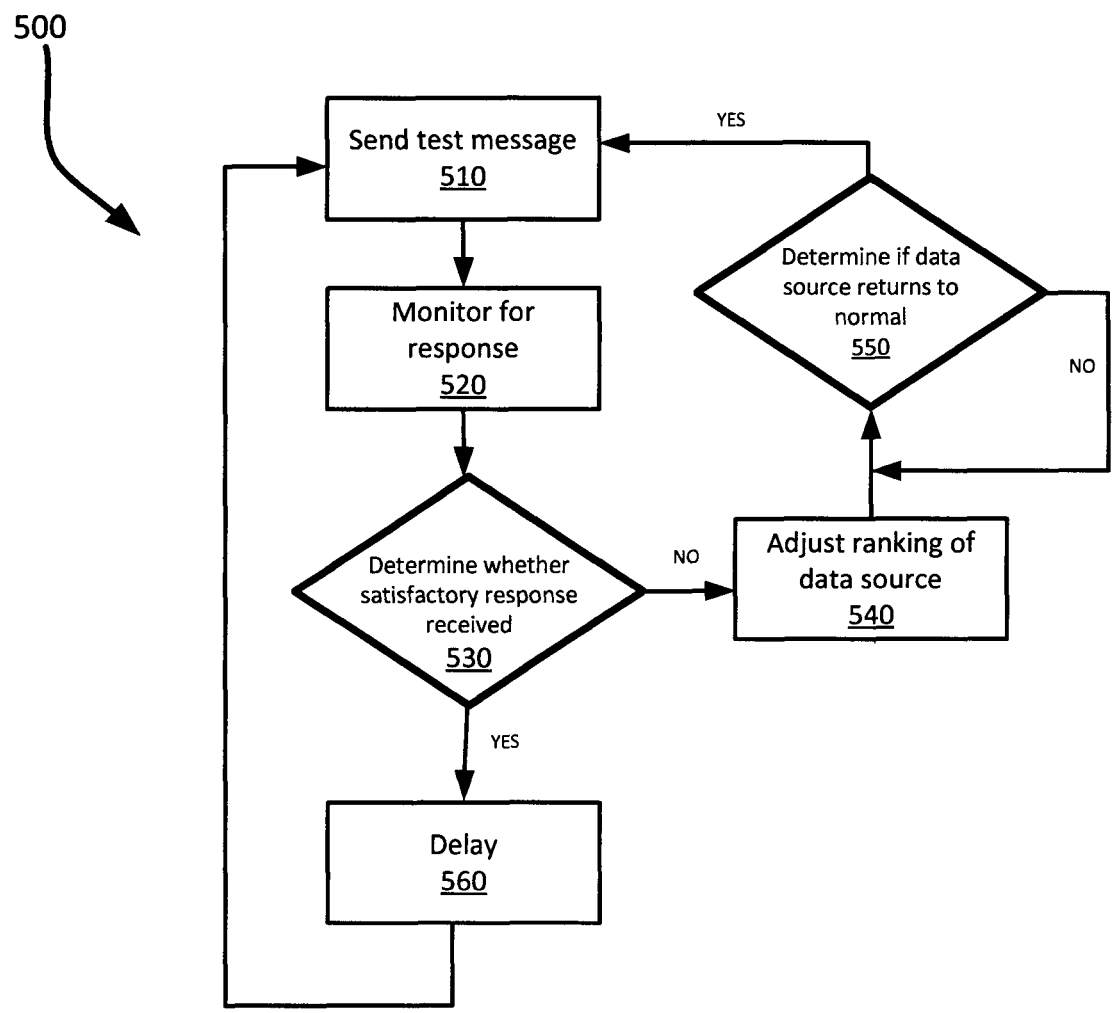
FIG. 3 is a flow chart of a method of ranking a plurality of data sources in accordance with an embodiment.

Referring now to FIG. 3, a method of ranking a plurality of data sources 90 is represented in the form of a flow-chart and indicated generally at 500. In order to assist in the explanation of the method 500, it will be assumed that the method 500 is performed using the system 50. Furthermore, the following discussion of the method 500 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 500 can be varied, and need not work exactly as discussed herein in conjunction with each other, and that such variations are within the scope of the present invention. Furthermore, it is to be emphasized, that method 500 need not be performed in the exact sequence as shown and that various blocks can be performed in parallel rather than in sequence; hence the elements of the method 500 are referred to herein as "blocks" rather than "steps".

Block 510 comprises sending a test message from the server 54 to a preferred data source selected from the data sources 90. Continuing with the same example from above, it is to be assumed that the data source 90-1 is selected to be the preferred data source. The manner by which the test message is sent is not particularly limited. For example, the test message can be a message generated by a ping function from the server 54 to the data source 90-1. For example, the IP address of each data source 90 can be stored in a table in the memory storage unit 64 such that the programming instructions 100 can direct the processor to ping the IP address associated with the data source 90-1.

The manner by which the preferred data source is selected is not particularly limited. In the present embodiment, the preferred data source is the data source 90 ranked at the top of a ranking table stored in the memory storage unit 64. It is to be appreciated that the ranking table is also not particularly limited and can be predetermined or generated by the server 54 in response to specific queries received by the server 54. For example, for determining the predetermined ranking table, the ranking table can be loaded into the server 54 based on available historical data associated with the data sources 90. For example, the predetermined ranking table can be based on data sources 90 with the most accurate information, the most information, and/or the fastest response time. It is to be appreciated that although the ranking table is preloaded into the memory storage unit 64, the ranking table is not static as the server 54 can be configured to adjust the ranking of the data sources 90.

In other embodiments, the programming instructions 100 can direct the processor 68 to generate the ranking table of the data sources 90 in response to a query for information from at least one of the data sources 90. The manner by which the ranking table is generated is not particularly limited. In one embodiment, the memory storage unit 64 can be configured to store the characteristics of the data sources 90, such as what information each of the data sources 90 includes. For example, the data source 90-1 can be known to include only address and phone numbers of businesses, whereas the data source 90-2 can be known to include only addresses and images of business. Accordingly, it is to be appreciated, with the benefit of this specification, that for a query requesting a phone number of a business, the generated ranking table would rank the data source 90-1 higher than the data source 90-2. Conversely, for a query requesting an image of a business, the generated ranking table would rank the data source 90-2 higher than the data source 90-3. In instances where the query requests an address of a business, the ranking of the data sources 90-1 and 90-2 can be determined in accordance with tie-breaking rules or a predetermined preference. It is to be appreciated that in some embodiments, ties can be permitted, such as when the data sources 90-1 and 90-2 provide complimentary information. Accordingly, in embodiments where ties are permitted, instead of breaking the tie, the data from the data sources 90-1 and 90-2 can be merged into a single data record.

It is to be appreciated that several variations for generating the ranking table are contemplated and that other factors or a combination of several factors can be considered. Other examples of characteristics of the data sources 90 that can be stored include data associated with the accuracy of the data source 90 in specific geographical locations, and support for various languages. For example, for queries which include location information associated with the query (such as a query received from a portable electronic device providing global coordinates), some data sources 90 may be known to provide more accurate results associated with the specific region. Accordingly, the more accurate data sources 90 will be ranked higher in the generated ranking table. Similarly, if the language of the query is not supported by a data source 90, that data source would be ranked lower than a data source capable of supporting queries in that language. Another example of a factor that can be considered include the history of queries associated with a specific account using the server 54. It is to be appreciated by a person of skilled in the art that a variety of methods can be used to rank the data sources. For example, A/B testing can be used to compare the data sources 90. As another example, genetic algorithms can be used to rank the data sources 90.

Block 520 comprises monitoring the network 95 for a response to the test message sent at block 510 from the preferred data source, which is the data source 90-1 as assumed in the present example. The manner by which the processor 68 monitors the network 95 is not particularly limited. For example, the expected response message can include an identifier for identifying the type of message as well as the source of the response message. In this example, the server 54 can individually monitor each message received by the server to determine whether the message is the expected response message.

Block 530 comprises determining whether the response message from the data source 90-1 was received in accordance with a service level. The service level is not particularly limited and can be predetermined or dependent on factors such as the specific query or the anticipated response of the data sources 90. It is to be appreciated, with the benefit of this description, that the service level can be based on other factors such as the quality of data or the geographical coverage area of the data source 90.

The manner by which the determination at block 530 is made is not particularly limited and can depend on the definition of the service level used in a specific embodiment. For example in one embodiment, the service level includes a threshold speed for a response. Accordingly, the determination of whether the response message is in accordance with the service level can involve measuring the speed of the response message. In this embodiment, the speed of the response message can be expressed as the elapsed time from when the test message was sent to when the response message is received. In another embodiment, the service level can include a predetermined time interval by which the response message associated with a test message is to be received. The pre-determined time interval is not particularly limited and may be a fixed value or could be relative to the standard deviation of typical response times. For example, the pre-determined time interval can be set to be twice the standard deviation for a particular type of search. Accordingly, the determination of whether the response message is in accordance with the service level involves determining whether a response message was received within the predetermined time interval since the test message was sent. It is to be understood than if a response message is not sent by the data source 90-1, the predetermined time interval will prevent the server 54 from indefinitely waiting for the response message. If the service level is not satisfied, the method 500 proceeds to block 540. If the service level is satisfied, the method 500 proceeds to block 560.

As another example of a variation, the service level can also be defined in relative terms among the data sources 90. For example, the service level can be set as the fastest known response message speed. Accordingly, the server 54 can effectively use the fastest known response message speed as the threshold speed that changes whenever a new data source 90 becomes faster. It is to be appreciated, with the benefit of this description, that the variation would dynamically rank the fastest data source 90 at the top of the ranking table by continuously comparing the response speeds among the data sources 90.

As yet another example of a variation, the service level can be defined to include a minimum number of failed response messages before proceeding to block 540. For example, the method 500 can be modified to include three iterations of blocks 510 to 530 before proceeding to block 540.

Continuing with the present example where the data source 90-1 is the preferred data source, block 540 comprises adjusting the rank of the data source 90-1 in the ranking table when the service level is not satisfied. The manner by which the ranking table is adjusted is not particularly limited. For example, in the present embodiment, if the data source 90-1 fails to satisfy the service level, the data source 90-1 is blocked to prevent sending any further queries to the data source 90-1. The manner by which the data source 90-1 is blocked is also not particularly limited and can include a flag in the ranking table. Alternatively, the rank of the data source 90-1 can be changed to block the data source. In other embodiments, the rank of the data source 90-1 can be slightly lowered such that the query is initially directed to another data source 90-2. For example, if the data source 90-1 response speed has decreased slightly, the server 54 may slightly decrease the rank of the data source 90-1 instead of blocking the data source 90-1.

It is to be appreciated that after block 540 is carried out, the server 54 has successfully ranked the data sources 90. It is to be appreciated, with the benefit of this description, that the server 54 is a robust device capable of continued operation after the initial ranking of the data sources 90 to continually re-assess and re-rank the data sources. In the present embodiment, block 550 comprises determining whether the preferred data source, which in the present example is the data source 90-1, has returned to normal such that the data source 90-1 can satisfy the service level and be ranked higher once again in the ranking table. The manner by which the determination is made is not particularly limited and can include intermittently sending recovery messages to the data source 90-1. The nature of the recovery message is not limited and in can be similar or identical to the test messages discussed above in connection with block 510 and separate testing routine is carried out as discussed in greater detail below. If the data source 90-1 has returned to normal, the method 500 returns to block 510 where the server 54 continues to monitor the data source 90-1 as described. If the data source 90-1 has not returned to normal, the method 500 loops until the data source 90-1 returns to normal.

Block 560 comprises a delay. The manner by which the delay is implemented is not particularly limited. In the present embodiment, the delay is a set period of time. For example, the delay slows down the frequency of implementations of the method 500. It is to be appreciated that in some embodiments, the data source 90 may limit the number of test messages received from a specific account. Accordingly, sending test messages 510 as fast as the server 54 can send would result in unnecessarily consuming all permitted test messages quickly as well as consuming significant system resources.

Figure 4:
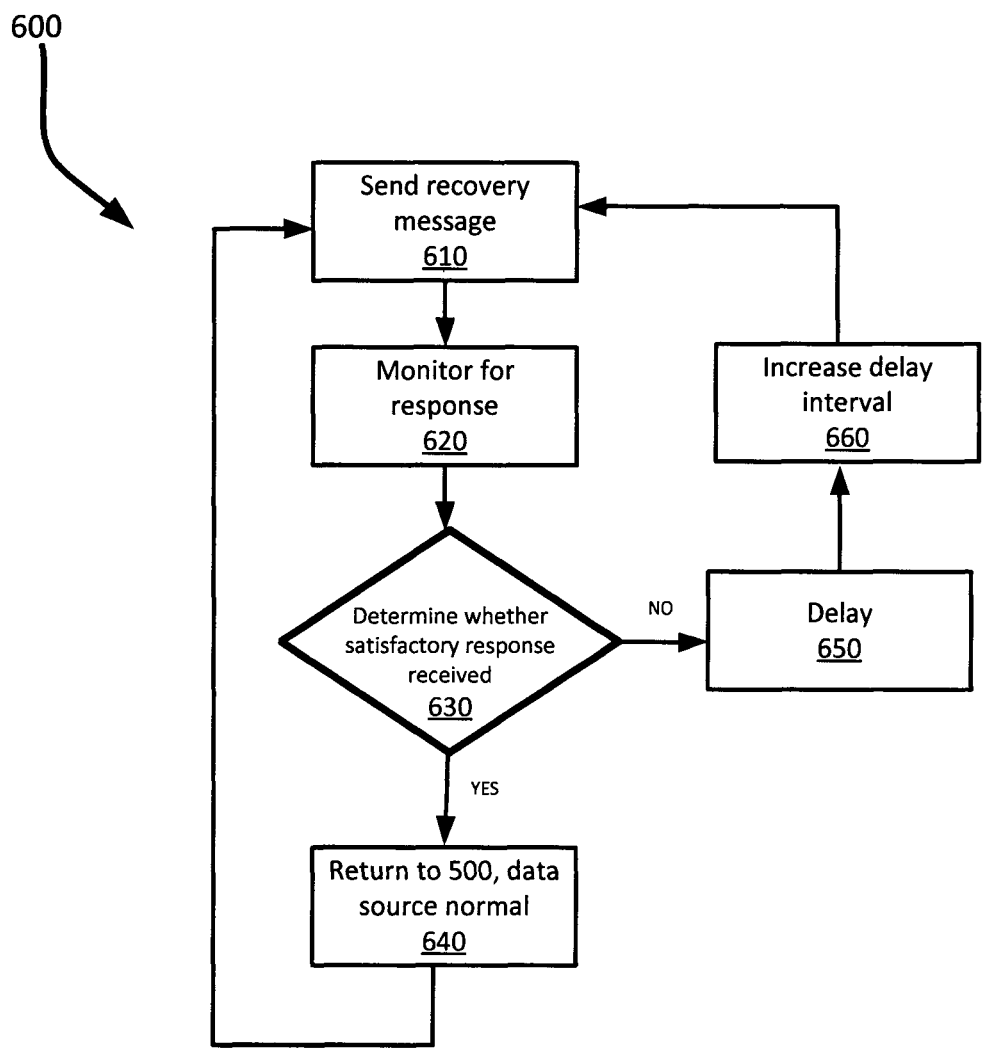
FIG. 4 is a flow chart of a method of determining whether the data source returns to normal in accordance with an embodiment.

Referring now to FIG. 4, a method of determining whether the preferred data source, which in the present example is the data source 90-1, has returned to normal operation is represented in the form of a flow-chart and indicated generally at 600.

Block 610 comprises sending a recovery message from the server 54 to the data source 90-1, which has failed to satisfy a service level. The recovery message is not particularly limited and can be similar to the test message discussed above. For example, the recovery message can be a message generated by a ping function from the server 54 to the data source 90-1. For example, the IP address of each data source 90 can be stored in a table in the memory storage unit 64 such that the programming instructions 100 can direct the processor to ping the IP address associated with the data source 90-1.

Block 620 comprises monitoring the network 95 for a response to the recovery message sent at block 610 from the preferred data source, which is the data source 90-1 as assumed in the present example. The manner by which the processor 68 monitors the network 95 is not particularly limited. For example, the expected response message to the recovery message can be similar to a response message discussed above and include an identifier for identifying the type of message as well as the source of the response message. In this example, the server 54 can individually monitor each message received by the server to determine whether the message is the expected response message.

Block 630 comprises determining whether the response message from the data source 90-1 was received in accordance with a service level. The service level is not particularly limited and can include similar steps to those discussed above in connection with block 530. If the service level is satisfied, the method 600 proceeds to block 640 and returns a confirmation to block 550 allowing the method 500 to proceed to block 510 again.

Block 650 comprises a delay. The manner by which the delay is implemented is not particularly limited. In the present embodiment, the delay is a set period of time or the delay can be variable. For example, the delay slows down the frequency of implementations of the method 600. It is to be appreciated that in some embodiments, the data source 90 may limit the number of recovery messages received from a specific account. Accordingly, sending recovery messages 610 as fast as the server 54 can send would result in unnecessarily consuming all permitted messages at the data source 90 quickly. However, it is to be appreciated, with the benefit of this description that the failure of a data source 90 to satisfy the service level is often temporary. For example, misconfigured servers could cause a temporary outage. As another example, some countries can impose unpredictable temporary traffic restrictions which may be due to political reasons, or infrastructure failure. Other examples can include congested networks dropping packets and weather and/or environmental events that cause physical damage to infrastructure. Accordingly, decreasing the delay can potentially decrease the amount of time that the data source 90-1 is subjected to limited availability due to its rank in the ranking table.

Block 660 comprises increasing the delay interval used in block 650 such that a following iteration is subject to a longer delay. It is to be appreciated, with the benefit of this description, that if the data source 90-1 does not return to normal immediately, the probability that the data source 90-1 would return to normal within a short period of time decreases. Accordingly, by increasing the time interval, the number of requests sent to the data source 90-1 is reduced. The manner by which the time interval is increased is not limited. For example, the time interval can be increased in a linear manner or exponentially increasing manner. Furthermore, the time interval can be subjected to a maximum in some embodiments. For example, in the present embodiment, the time interval is capped to be no longer than the time interval discussed in connection with block 560. Accordingly, after the time interval reaches a maximum, the frequency of the method 600 is similar to that of the method 500.

While specific embodiments have been described and illustrated, such embodiments should be considered illustrative only and should not serve to limit the accompanying claims.

What is claimed is:

1. A server for ranking of a plurality of data sources for processing queries, the server comprising:
   a network interface for connecting to an external network having the plurality of data sources;
   a memory storage unit for storing a ranking table of the plurality of data sources; and
   a processor in communication with the network interface and the memory storage unit, the processor configured to:
      rank each of the plurality of data sources based on characteristics of the plurality of data sources, wherein the characteristics of the plurality of data sources comprise one or more types of data provided by each of the plurality of data sources and a response time from each of the plurality of data sources to the server;
      receive, by the server, a query for information;
      parse the query to identify a context comprising one of a content context or a location context for the information;
      identify a first preferred data source based on the context and the ranking of the plurality of data sources;
      transmit the query for information to the first preferred data source;
      receive, by the server, a response message from the first preferred data source;
      determine whether the response message satisfies a service level, wherein the service level depends on a threshold speed of receiving the response message from the first preferred data source;
      dynamically adjust a rank of the first preferred data source based on the determined satisfaction of the service level, wherein the first preferred data source is reduced to a previously preferred data source based on the adjusted rank, and wherein another data source is designated a second preferred data source for responding to the query for information; and
      after a delay time lapses, transmit a recovery message to the previously preferred data source, wherein a response to the recovery message enables the previously preferred data source to be re-designated as the first preferred data source based on a subsequent dynamic adjustment of the adjusted rank.

2. The server of claim 1, wherein the processor is further configured to:
   generate a ranking table based on the ranked data sources;
   identify a plurality of preferred data sources when more than one of the ranked data sources are tied for the highest rank;
   transmit the query for information to the plurality of preferred data sources;
   receive, by the server, the response message from one of the plurality of preferred data sources; and
   dynamically adjust the rank of the one of the plurality of preferred data sources based on the determined satisfaction of the service level.

3. The server of claim 2, wherein the query for information is configured to retrieve information from the one of the plurality of the data sources, and wherein the ranking table is generated based on the query for information and the characteristics of the plurality of data sources.

4. The server of claim 3, wherein the ranking table is generated based on an identity of an entity associated the query for information and the characteristics of the plurality of data sources.

5. The server of claim 2, wherein the ranking table is generated based on a location associated with the query for information and the characteristics of the plurality of data sources.

6. The server of claim 3, wherein the ranking table is generated based on a language of the query for information and the characteristics of the plurality of data sources.

7. The server of claim 1, wherein the processor is configured to measure a speed of the response message.

8. The server of claim 7, wherein the processor is configured to determine whether the speed of the response message is slower than a second speed associated with a second data source.

9. The server of claim 1, wherein the processor is configured to determine whether the response message was received before a predetermined time interval.

10. The server of claim 1, wherein the processor is configured to block the first preferred data source when the service level is not satisfied.

11. The server of claim 1, wherein the processor is configured to determine, based on the response to the recovery message, whether the previously preferred data source subsequently satisfies the service level.

12. The server of claim 11, wherein the processor is configured to send intermittent recovery messages to the previously preferred data source after reducing the first preferred data source to the previously preferred data source.

13. The server of claim 12, wherein the processor is configured to send the recovery messages separated by a varying time delay.

14. The server of claim 13, wherein the processor is configured to increase the varying time delay between each of the recovery messages.

15. A method of ranking of a plurality of data sources, the method comprising:
  ranking each of the plurality of data sources based on characteristics of the plurality of data sources, wherein the characteristics of the plurality of data sources comprise one or more types of data provided by each of the plurality of data sources and a response time from each of the plurality of data sources to the server;
  receiving, by the server, a query for information;
  parsing the query to identify a context comprising at least one of a content characteristic or a location characteristic for the information;
  identifying a first preferred data source based on the context and the ranking of the plurality of data sources;
  transmitting the query for information to the first preferred data source;
  receiving, by the server, a response message from the first preferred data source;
  based on one of the content characteristics or the location characteristics, determining, at the server, whether the response message satisfies a service level, wherein the service level depends on a threshold speed of receiving the response message from the first preferred data source;
  dynamically adjusting a rank of the first preferred data source based on the determined satisfaction of the service level, wherein the first preferred data source is reduced to a previously preferred data source based on the adjusted rank, and wherein another data source is designated a second preferred data source for responding to the query for information; and
  after a delay time lapses, transmitting a recovery message to the previously preferred data source, wherein a response to the recovery message enables the previously preferred data source to be re-designated as the first preferred data source based on a subsequent dynamic adjustment of the adjusted rank.

16. The method of claim 15, further comprising:
  generating a ranking table;
  identifying a plurality of preferred data sources when more than one of the ranked data sources are tied for the highest rank;
  transmitting the query for information to the plurality of preferred data sources;
  receiving, by the server, the response message from one of the plurality of preferred data sources; and
  dynamically adjusting the rank of the one of the plurality of preferred data sources based on the determined satisfaction of the service level.

17. The method of claim 16, wherein the query for information is configured to retrieve information from the one of the plurality of the data sources.

18. The method of claim 17, wherein the ranking table is generated based on the query for information and the characteristics of the plurality of data sources.

19. The method of claim 18, wherein the ranking table is generated based on a location associated with the query for information and the characteristics of the plurality of data sources.

20. The method of claim 17, wherein the ranking table is generated based on a language of the query for information and the characteristics of the plurality of data sources.

21. The method of claim 15, wherein determining whether the response message was in accordance with the service level comprises measuring a speed of the response message.

22. The method of claim 21, wherein determining whether the response message was in accordance with the service level comprises determining whether the speed of the response message is slower than a second speed associated with a second data source.

23. The method of claim 15, wherein determining whether the response message was in accordance with the service level comprises determining whether the response message was received before a predetermined time interval.

24. The method of claim 15, further comprising blocking the first preferred data source when the service level is not satisfied.

25. The method of claim 15, further comprising intermittently determining, based on the response to the recovery message, whether the previously preferred data source subsequently satisfies the service level after reducing the first preferred data source to the previously preferred data source.

26. The method of claim 25, wherein intermittently determining comprises intermittently sending recovery messages to the previously preferred data source.

27. The method of claim 26, wherein intermittently determining comprises sending the recovery messages separated by a varying time delay.

28. The method of claim 27, further comprising increasing the varying time delay between each of the recovery messages.

29. A non-transitory computer readable medium encoded with codes for ranking a plurality of data sources for processing queries, the codes for directing a processor to:
  rank each of the plurality of data sources based on characteristics of the data sources in a ranking table, wherein the characteristics of the plurality of data sources comprise one or more types of data provided by each of the plurality of data sources and a response time from each of the plurality of data sources to the server;
receive, by the server, a query for information;
parse the query to identify a context comprising at least one of a content characteristic or a location characteristic for the information;
identify a first preferred data source based on the context and the ranking of the plurality of data sources;
transmit the query for information to the first preferred data source;
receive, by the server, a response message from the first preferred data source;
based on one of the content characteristic or the location characteristic, determine whether the response message from the first preferred data source satisfies a service level, wherein the service level depends on a threshold speed of receiving the response message from the first preferred data source;
dynamically adjust a rank of the first preferred data source based on the determined satisfaction of the service level, wherein the first preferred data source is reduced to a previously preferred data source based on the adjusted rank, and wherein another data source is designated a second preferred data source for responding to the query for information; and
after a delay time lapses, transmit a recovery message to the previously preferred data source, wherein a response to the recovery message enables the previously preferred data source to be re-designated as the first preferred data source based on a subsequent dynamic adjustment of the adjusted rank.

* * * * *